United States Patent
Ikuta

(10) Patent No.: US 9,780,626 B2
(45) Date of Patent: Oct. 3, 2017

(54) ROTOR OF ROTARY ELECTRIC MACHINE

(71) Applicant: DENSO CORPORATION, Kariya, Aichi-pref. (JP)

(72) Inventor: Hiroyuki Ikuta, Anjo (JP)

(73) Assignee: DENSO CORPORATION, Kariya (JP)

( * ) Notice: Subject to any disclaimer, the term of this patent is extended or adjusted under 35 U.S.C. 154(b) by 100 days.

(21) Appl. No.: 14/732,156

(22) Filed: Jun. 5, 2015

(65) Prior Publication Data

US 2015/0357869 A1 Dec. 10, 2015

(30) Foreign Application Priority Data

Jun. 6, 2014 (JP) ................................. 2014-118010

(51) Int. Cl.
*H02K 1/27* (2006.01)
*H02K 9/22* (2006.01)
*H02K 1/28* (2006.01)

(52) U.S. Cl.
CPC ................. *H02K 9/22* (2013.01); *H02K 1/28* (2013.01); *H02K 1/276* (2013.01)

(58) Field of Classification Search
USPC ............ 310/156.08, 156.09, 156.12, 156.13, 310/156.14
See application file for complete search history.

(56) References Cited

U.S. PATENT DOCUMENTS

| | | | | |
|---|---|---|---|---|
| 2,708,246 | A * | 5/1955 | Dunn | B29C 39/00 174/194 |
| 4,326,333 | A * | 4/1982 | Otto | F16C 27/08 29/525 |
| 5,710,473 | A * | 1/1998 | Nobe | H02K 3/32 310/235 |
| 6,701,793 | B2 * | 3/2004 | Wallin | G01L 3/102 73/862.333 |
| 8,035,273 | B2 * | 10/2011 | Ionel | H02K 1/22 310/156.08 |
| 2006/0138894 | A1 * | 6/2006 | Harada | H02K 1/28 310/216.004 |
| 2007/0052310 | A1 * | 3/2007 | Sakai | F02M 37/048 310/87 |
| 2008/0315714 | A1 | 12/2008 | Badey et al. | |
| 2009/0059635 | A1 * | 3/2009 | Ito | H01L 24/01 363/141 |

(Continued)

FOREIGN PATENT DOCUMENTS

JP 2-294241 12/1990
JP 2013-99222 A 5/2013

*Primary Examiner* — Naishadh Desai
(74) *Attorney, Agent, or Firm* — Nixon & Vanderhye P.C.

(57) ABSTRACT

A rotor includes a shaft having knurled portions and a rotor core having a fitting-recess that is fitted and fixed to the knurled portions. The shaft has a small diameter portion on one end of the knurled portions and a flange portion on another end. The rotor core has a small diameter hole on one end of the fitting-recess. When the fitting-recess is fitted into the knurled portions, an end face in the other end of the rotor core abuts the flange portion, while a stepped surface between the fitting-recess and the small diameter hole contacts with an end face in the one end of the knurled portions. Thus, a filler is sealed in gaps formed between the knurled portions and an internal wall of the fitting-recess.

7 Claims, 2 Drawing Sheets

(56) References Cited

U.S. PATENT DOCUMENTS

| | | | |
|---|---|---|---|
| 2011/0221296 A1* | 9/2011 | Vedy | H02K 1/2773 |
| | | | 310/156.14 |
| 2012/0014823 A1* | 1/2012 | Riedl | H02K 1/30 |
| | | | 417/423.12 |
| 2012/0139378 A1 | 6/2012 | Endo | |

* cited by examiner

OUTER DIAMETER SIDE

INNER DIAMETER SIDE

ROTOR OF ROTARY ELECTRIC MACHINE

CROSS-REFERENCE TO RELATED APPLICATION

This application is based on and claims the benefit of priority from earlier Japanese Patent Application No. 2014-118010 filed Jun. 6, 2014, the description of which is incorporated herein by reference.

TECHNICAL FIELD

The present disclosure relates to a rotor of a rotary electric machine mounted on a vehicle such as a hybrid vehicle or an electric vehicle, for example, used as a motor or a generator.

BACKGROUND

Conventionally, a rotating field type synchronous motor (hereinafter referred to as an IPM motor) with a structure where permanent magnets are embedded inside a rotor is known as a rotary electric machine mounted and used in a vehicle.

Since the IPM motor is highly efficient because it is possible to utilize both reluctance torque due to the magnetization of the rotor and torque due to the magnetization of the permanent magnet, the IPM motor is preferably employed in a hybrid vehicle or an electric vehicle.

Such an IPM motor includes a stator that functions as an armature, and a rotor that functions as a magnetic field disposed to face the stator in a radial direction.

A rotor equipped with a shaft (rotation axis) having knurled portions formed by knurl processing on an outer peripheral surface thereof, and a rotor core having a fitting-recess that is fitted and fixed to the knurled portions of the shaft are disclosed in Japanese Patent Application Laid-Open Publication No. 2-294241.

Incidentally, in the above IPM motor, the rotor core generates heat due to a core loss of the rotor core and eddy current loss by the permanent magnets.

However, as the rotor disclosed in the above Publication '241, when the knurled portion of the shaft is fitted into the fitting-recess of the rotor core by press-fitting, the shaft and the rotor core are in contact only at tips of the knurled portion.

Therefore, since the heat of the rotor core is transmitted to the shaft through air in gaps formed between the knurled portions of the shaft, and an internal wall of the fitting-recess of the rotor core, heat radiation properties are low.

If the heat radiation properties of the rotor core are low, it causes demagnetization of magnets, lowering strength of secondary conductors, or seizure of bearings.

Moreover, when an engagement in the knurled portion is enlarged in order to increase contacting areas between the shaft and the rotor core, it is necessary to increase the press-fitting force of the shaft into the fitting-recess of the rotor core, thus the productivity may become worse.

SUMMARY

An embodiment provides a rotor of a rotary electric machine that can improve heat radiation properties of the rotor core.

In a rotor of a rotary electric machine according to a first aspect, the rotor of the rotary electric machine includes a shaft having knurled portions formed by knurl processing on an outer peripheral surface of the shaft and a rotor core having a fitting-recess that is fitted and fixed to the knurled portions of the shaft.

The shaft includes a small diameter portion, which has a diameter smaller than a diameter of the knurled portions, formed on a proximal end of the knurled portions, and a flange portion formed on a distal end of the knurled portions.

The rotor core includes a small diameter hole, which has a diameter smaller than the diameter of the fitting-recess, formed on a proximal end of the fitting-recess.

When the fitting-recess is fitted into the knurled portions of the shaft, an end face in a distal end of the rotor core abuts the flange portion, while a stepped surface formed between the fitting-recess and the small diameter hole is in a condition of contacting with a stepped surface formed between the knurled portions and the small diameter portion.

A filler is sealed in gaps formed between the knurled portions of the shaft and an internal wall of the fitting-recess of the rotor core.

The filler used in the present disclosure may be anything having a higher thermal conductivity than air.

As the filler, for example, lubricating oil such as machine oil, press oil, liquid paraffin, or grease such as silicone grease or fluorine grease can be suitably employed.

According to the present disclosure, the filler is sealed in the gaps (hereinafter also referred to as knurled portion gaps) formed between the knurled portions of the shaft and the internal wall of the fitting-recess of the rotor core.

Accordingly, since heat generated in the rotor core due to core loss of the rotor core and eddy current loss by the permanent magnets can be easily transmitted to the shaft through the filler sealed in the knurled portion gaps, it is possible to improve the heat radiation properties of the rotor core.

Further, according to the present disclosure, when the fitting-recess of the rotor core is fitted onto the knurled portions of the shaft, the end face in the distal end of the rotor core abuts the flange portion, while the stepped surface formed between the fitting-recess and the small diameter hole contacts with the stepped surface formed between the knurled portions and the small diameter portion.

Therefore, sealing of the filler into the knurled portion gaps can be easily realized by press-fitting the shaft in the rotor core after applying the filler onto the knurled portions of the shaft.

DETAILED DESCRIPTION OF THE PREFERRED EMBODIMENTS

Hereinafter will be specifically described embodiments of a rotor of a rotary electric machine according to the present disclosure with reference to the accompanying drawings.

First Embodiment

A rotor of a rotary electric machine according to a first embodiment will be described with reference to FIGS. 1 and 2.

A rotor 1 of a rotary electric machine in the first embodiment is, for example, intended to be used as a rotary electric machine such as a motor for a vehicle, and is accommodated rotatably inside a stator (not shown) in a housing of the rotary electric machine.

Figure 1:
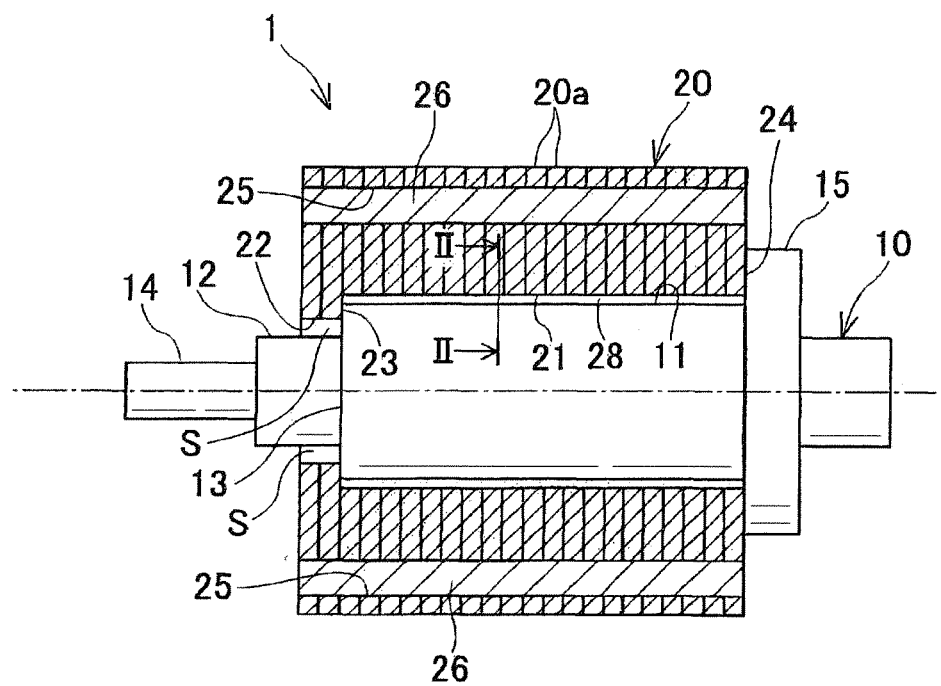
FIG. 1 shows a sectional view along an axial direction of a rotor of a rotary electric machine according to a first embodiment.

As shown in FIG. 1, the rotor 1 includes a shaft 10 and a rotor core 20. The shaft has knurled portions 11 formed by knurl processing on an outer peripheral surface of the shaft 10. The rotor core 20 has a fitting-recess 21 that is fitted and fixed to the knurled portions 11 of the shaft 10.

Shaft 10 is made of iron-based metal formed in a solid long shaft shape.

The knurled portions 11 are formed by knurl processing on the outer peripheral surface of a center portion in an axial direction of the shaft 10.

A proximal end (left side in FIG. 1) of the knurled portions 11 (of the shaft 10) has a small diameter portion 12, which is a smaller diameter than the knurled portions 11.

A stepped surface 13 is formed between the knurled portions 11 and the small diameter portion 12.

Then, a proximal end (left side in FIG. 1) of the small diameter portion 12 has a minimum diameter portion 14, which is a smaller diameter than the small diameter portion 12.

Further, a distal end (right side in FIG. 1) of the knurled portions 11 has a ring-shaped flange portion 15, which is a larger outer diameter than the knurled portions 11.

Thus, the knurled portions 11 are disposed between the small diameter portion 12 and the flange portion 15 of the shaft 10.

The rotor core 20 is formed into a cylindrical shape by laminating in the axial direction a plurality of steel plates 20a formed in a predetermined ring shape by punching, and connecting and fixing by crimping.

The fitting-recess 21 that is fitted and fixed to the knurled portions 11 of the shaft 10 is provided in the rotor core 20 excluding an axial end portion (left end in FIG. 1) of an inner hole that penetrates in the axial direction.

An inner diameter of the fitting-recess 21 is slightly smaller than the outer diameter of the knurled portions 11.

Thus, projecting tips of the knurled portions 11 are press-contacted and engaged with an internal wall of the fitting-recess 21, and the shaft 10 and the rotor core 20 are prevented from relative displacement in a rotational direction.

A proximal end (left side in FIG. 1) of the fitting-recess 21 has a small diameter hole 22, which is a smaller diameter than the fitting-recess 21.

A stepped surface 23 is formed between the fitting-recess 21 and the small diameter hole 22.

The diameter of the small diameter hole 22 is a predetermined width larger than the diameter of the small diameter portion 12 of the shaft 10.

Thus, a predetermined gap S is formed between an internal wall of the small diameter hole 22 and an outer peripheral surface of the small diameter portion 12.

It should be noted that the outer diameter of the rotor core 20 is generally constant from a proximal end to a second end.

The rotor core 20 is fitted and fixed by press-fitting the fitting-recess 21 to the outside of the knurled portions 11 from the proximal end of the shaft 10.

At this time, an end face 24 in the distal end of the rotor core 20 abuts (including press-contacting, and the same applies to the following.) the flange portion 15, while the stepped surface 23 formed between the fitting-recess and the small diameter hole 22 is in a condition of contacting with the stepped surface 13 formed between the knurled portions 11 and the small diameter portion 12.

Figure 2:
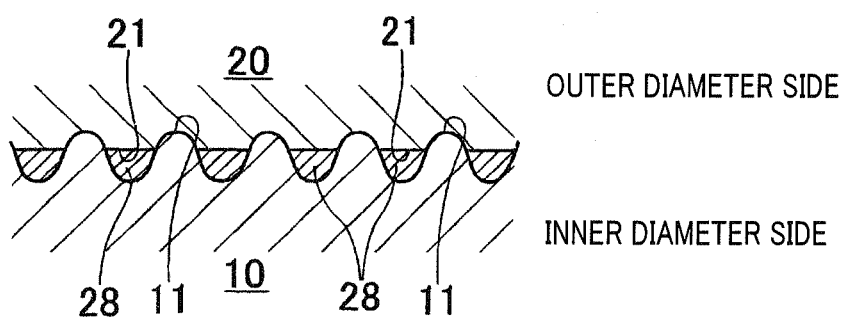
FIG. 2 shows an expanded view of a cross section of a portion taken along the line II-II in FIG. 1 expanded in a plane.

As a result, as shown in FIG. 2, a filler 28 is sealed in gaps (knurled portion gaps) formed between the knurled portions 11 of the shaft 10 and the internal wall of the fitting-recess 21 of the rotor core 20.

The filler 28 is applied onto surfaces of the knurled portions 11 just before press-fitting the knurled portions 11 of the shaft 10 into the fitting-recess 21 of the rotor core 20.

In the first embodiment, lubricating oil is selected from machine oil, press oil, liquid paraffin or other suitable oil, for example, is employed as the filler 28.

Thus, since a lubricity is improved when press-fitting the knurled portions 11 of the shaft 10 into the fitting-recess 21 of the rotor core 20, it is possible to reduce press-fitting load, and improved manufacturing is achieved.

A plurality (8 in the first embodiment) of magnet accommodating holes 25 extending in the axial direction are formed in the circumferential direction in an outer periphery of the rotor core 20 with a predetermined spacing therebetween.

A single permanent magnet 26 is embedded into each magnet accommodating hole 25 so that a plurality of polarities differ in magnetic poles alternately in the circumferential direction (8 poles in the first embodiment (N pole: 4, S pole: 4)).

The above-mentioned filler 28 sealed in the knurled portion gap has a boiling point higher than a heat demagnetization starting temperature of the permanent magnets 26 accommodated in the magnet accommodating holes 25 of the rotor core 20.

Thus, since the filler 28 does not evaporate at a temperature lower than the heat demagnetization starting temperature, it is possible to prevent the permanent magnet 26 from heat demagnetization more reliably.

According to the rotor 1 of the first embodiment configured as described above, the filler 28 is sealed in the gaps (knurled portion gaps) formed between the knurled portions 11 of the shaft 10 and the internal wall of the fitting-recess 21 of the rotor core 20.

Accordingly, since heat generated in the rotor core 20 due to a core loss of the rotor core 20 and eddy current loss by the permanent magnets 26 can be easily transmitted to the shaft 10 through the filler 28 sealed in the knurled portion gaps, it is possible to improve the heat radiation properties of the rotor core 20.

Further, according to the rotor 1 of the first embodiment, when the fitting-recess 21 of the rotor core 20 is fitted onto the knurled portions 11 of the shaft 10, the end face 24 in the distal end of the rotor core 20 abuts the flange portion 15, while the stepped surface 23 of the rotor core 20 is in contact with the stepped surface 13 of the shaft 10.

Therefore, it is possible to prevent the filler 28 sealed in the knurled portion gap from outflowing to both sides in the axial direction reliably.

In this case, sealing of the filler 28 into the knurled portion gaps can be realized by press-fitting the shaft 10 in the rotor core 20 after applying the filler 28 onto the knurled portions 11 of the shaft 10, thus manufacturing becomes easier.

Further, the lubricating oil is employed as the filler 28 to be sealed in the knurled portion gaps in the first embodiment.

Thus, since a lubricity is improved when press-fitting the knurled portions 11 of the shaft 10 into the fitting-recess 21 of the rotor core 20, it is possible to reduce press-fitting load, and manufacturing becomes easy.

Moreover, the filler 28 having the boiling point higher than the heat demagnetization starting temperature of the permanent magnets 26 is employed in the first embodiment.

Therefore, since the filler 28 does not evaporate at a temperature lower than the heat demagnetization starting temperature, it is possible to prevent the permanent magnet 26 from the heat demagnetization more reliably.

Further, the rotor core 20 of the first embodiment is formed by laminating and connecting the plurality of steel plates 20a in the axial direction.

Therefore, by separately punching the inner diameters of the steel plate 20a having the fitting-recess 21 and the steel plate 20a having the small diameter hole 22 when forming the steel plate 20a in the predetermined ring shape by punching, the stepped surface 23 between the fitting-recess 21 and the small diameter hole 22 of the rotor core 20 can be easily provided.

Second Embodiment

A rotor of the rotary electric machine according to the second embodiment will be described with reference to FIG. 3.

A rotor 2 of the second embodiment has the same basic configuration of the rotor 1 of the first embodiment, and is different from the rotor 1 of the first embodiment in a point that the small diameter portion 12 of the shaft 10 is press-fitted into the small diameter hole 22 of the rotor core 20, and that grease is employed as the filler 28.

Therefore, a detailed description of components and configurations that are common to the first embodiment are omitted and different points from the first embodiment and critical points will be described.

It should be noted that components and parts common to those in the first embodiment are given the same reference numerals.

Figure 3:
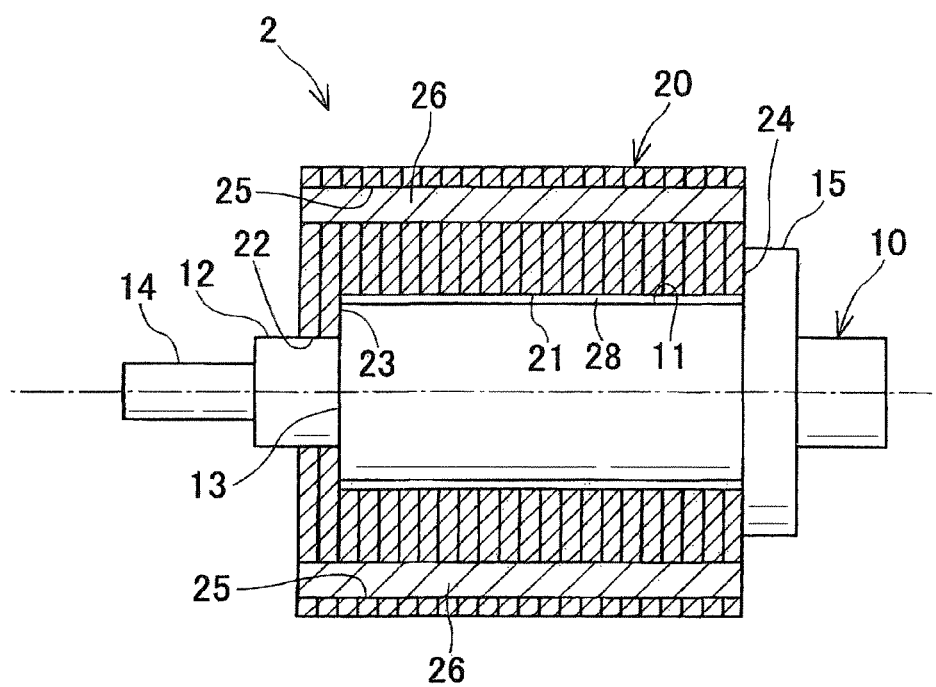
FIG. 3 shows a cross-sectional view along an axial direction of a rotor of a rotary electric machine according to a second embodiment.

The shaft 10 of the second embodiment is the same as the shaft 10 of the first embodiment, and is provided with the minimum diameter portion 14, small diameter portion 12, the stepped surface 13, the knurled portions 11, and the flange portion 15 in this order from the proximal end (left side in FIG. 3).

Further, similarly to the rotor core 20 of the first embodiment, the rotor core 20 of the second embodiment is provided with the small diameter hole 22, the stepped surface 23, and the fitting-recess 21 in this order from the proximal end (left side in FIG. 3).

That is, in the case of the second embodiment, it is the same condition as the first embodiment that the knurled portions 11 of the shaft 10 and the fitting-recess 21 of the rotor core 20 are fitted and fixed by press-fitting.

However, in the second embodiment, the diameter of the small diameter hole 22 is formed slightly smaller than the diameter of the small diameter portion 12 of the shaft 10.

Thereby, the small diameter portion 12 of the shaft 10 is also press-fitted into the small diameter hole 22 of the rotor core 20 at the same time when the knurled portions 11 of the shaft 10 are press-fitted into the fitting-recess 21 of the rotor core 20.

Incidentally, even in the case of the second embodiment, it is the same condition as the first embodiment that when the knurled portions 11 of the shaft 10 are press-fitted into the fitting-recess 21 of the rotor core 20, the flange portion 15 of the shaft 10 and the end face 24 in the distal end of the rotor core 20 are in contact, while the stepped surface 13 of the shaft 10 and the stepped surface 23 of the rotor core 20 are in contact.

Further, in the second embodiment, instead of the lubricating oils employed in the first embodiment, grease with a higher viscosity than the lubricating oils such as silicone grease or fluorine grease, for example, is employed as the filler 28 sealed in the gaps (knurled portion gaps) formed between the knurled portions 11 of the shaft 10 and the internal wall of the fitting-recess 21 of the rotor core 20.

Thus, by using the filler 28 with the high viscosity, it is possible to improve the sealing properties of the filler 28 to the knurled portion gaps.

According to the rotor 2 of the second embodiment configured as described above, the filler 28 is sealed in the gaps (knurled portion gaps) formed between the knurled portions 11 of the shaft 10 and the internal wall of the fitting-recess 21 of the rotor core 20.

Therefore, even in the rotor 2 of the second embodiment, since the heat generated in the rotor core 20 can be easily transmitted to the shaft 10 through the filler 28 sealed in the knurled portion gaps, the same effect as in the first embodiment can be achieved such as to improve the heat radiation properties of the rotor core 20.

Particularly in the case of the second embodiment, since the small diameter portion 12 of the shaft 10 is press-fitted into the small diameter hole 22 of the rotor core 20, the filler 28 sealed in the knurled portion gaps can be reliably sealed.

In addition, a fixing force (extraction force) of the shaft 10 and the rotor core 20 in the axial direction can be strengthened.

Other Embodiments

It should be noted that the present disclosure is not limited to the above embodiments; however, various modifications are possible within the scope of the present disclosure.

For example, in the above embodiments, although applying the rotor of the rotary electric machine according to the present disclosure to a rotor of a vehicle motor has been described as an example, the present disclosure may be applied to a generator, an electric motor, or a rotary electric machine that can be selectively used as either a generator or an electric motor as the rotary electric machine mounted on the vehicle.

What is claimed is:

1. A rotor of a rotary electric machine comprising:
a shaft having knurled portions formed by knurl processing on an outer peripheral surface of the shaft; and
a rotor core having a fitting-recess that is fitted and fixed to the knurled portions of the shaft; wherein,
the shaft includes a small diameter portion, which has a diameter smaller than a diameter of the knurled portions, formed on a proximal end of the knurled portions and a flange portion formed on a distal end of the knurled portions;
the rotor core includes a small diameter hole, which has a diameter smaller than the diameter of the fitting-recess, formed on a proximal end of the fitting-recess; wherein,
when the fitting-recess is fitted into the knurled portions of the shaft, an end face in a distal end of the rotor core abuts the flange portion, while a first stepped surface formed between the fitting-recess and the small diameter hole is in a condition of contacting with a second stepped surface formed between the knurled portions and the small diameter portion; and a filler is sealed in gaps formed between the knurled portions of the shaft and an internal wall of the fitting-recess of the rotor core.

2. The rotor of the rotary electric machine according to claim 1, wherein, the small diameter portion of the shaft is press-fitted into the small diameter hole of the rotor core.

3. The rotor of the rotary electric machine according to claim 1, wherein, the filler is a lubricating oil.

4. The rotor of the rotary electric machine according to claim 1, wherein, the filler is a grease.

5. The rotor of the rotary electric machine according to claim 1, wherein, a plurality of permanent magnets are embedded into the rotor core in a circumferential direction with a predetermined spacing therebetween; and the filler has a boiling point higher than a heat demagnetization starting temperature of the permanent magnets.

6. The rotor of the rotary electric machine according to claim 1, wherein, the rotor core is formed by laminating and connecting a plurality of steel plates in an axial direction.

7. The rotor of the rotary electric machine according to claim 1, wherein, the shaft is configured to be press-fit into the rotor core.

* * * * *